United States Patent [19]
Dufour

[11] 3,963,132
[45] June 15, 1976

[54] PUBLIC WORKS APPLIANCE

[75] Inventor: Serge P. Dufour, Dammartin-en-Goele, France

[73] Assignee: Societe Anonyme: Poclain, Le-Plessis-Belleville, France

[22] Filed: July 10, 1974

[21] Appl. No.: 487,364

[30] Foreign Application Priority Data
July 16, 1973 France .............................. 73.26009

[52] U.S. Cl. ............................. 214/142; 180/89 R; 296/28 C
[51] Int. Cl.² .......................................... E02F 3/00
[58] Field of Search ................. 296/28 C; 180/89 R, 180/77 S; 280/150 D, 150 E; 214/142; 212/48, 49, 28

[56] References Cited
UNITED STATES PATENTS

| | | | |
|---|---|---|---|
| 2,631,737 | 3/1953 | Cullen | 180/77 S |
| 3,452,888 | 7/1969 | Larson et al. | 214/80 |
| 3,478,833 | 11/1969 | Breon et al. | 180/77 S X |
| 3,690,395 | 9/1972 | Spiller et al. | 180/77 S X |
| 3,851,776 | 12/1974 | Leyrat | 280/150 D |

FOREIGN PATENTS OR APPLICATIONS 1,288,993  2/1969  Germany ........................... 214/142

Primary Examiner—Robert J. Spar
Assistant Examiner—Donald W. Underwood
Attorney, Agent, or Firm—Fitzpatrick, Cella, Harper & Scinto

[57] ABSTRACT

A public works appliance comprises a frame, a working attachment coupled to the frame and a control cab. The control cab contains a single control station and is mounted for rotation about an axis fixed relative to the frame. The cab may, therefore, be disposed in a first position in which the field of vision of a driver in the cab enables him to see and control the operation of the working tool, and in a second position in which the field of vision of the driver in the cab is unobstructed by the working attachment so that the appliance may be displaced, for example, along a road at a high speed.

3 Claims, 3 Drawing Figures

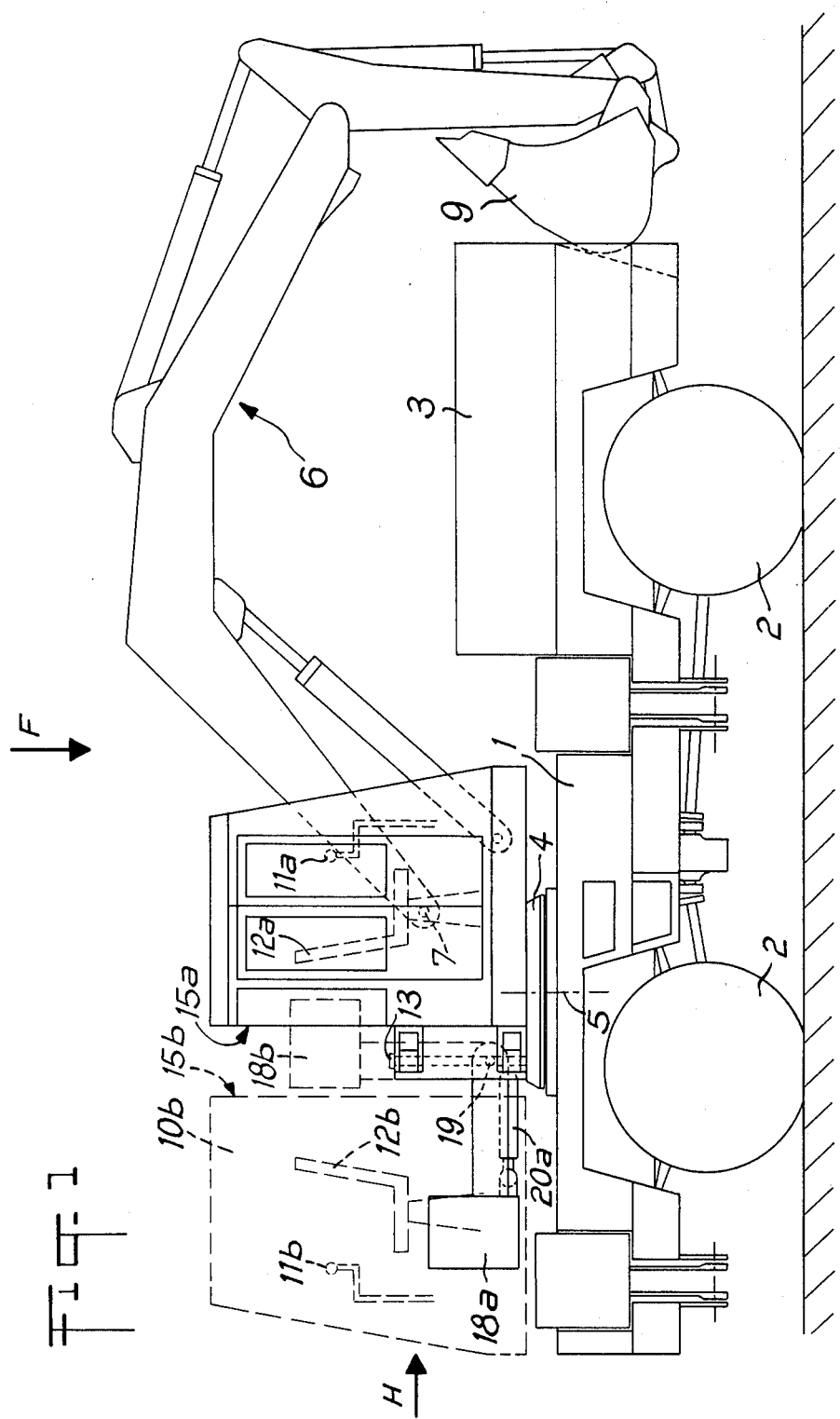

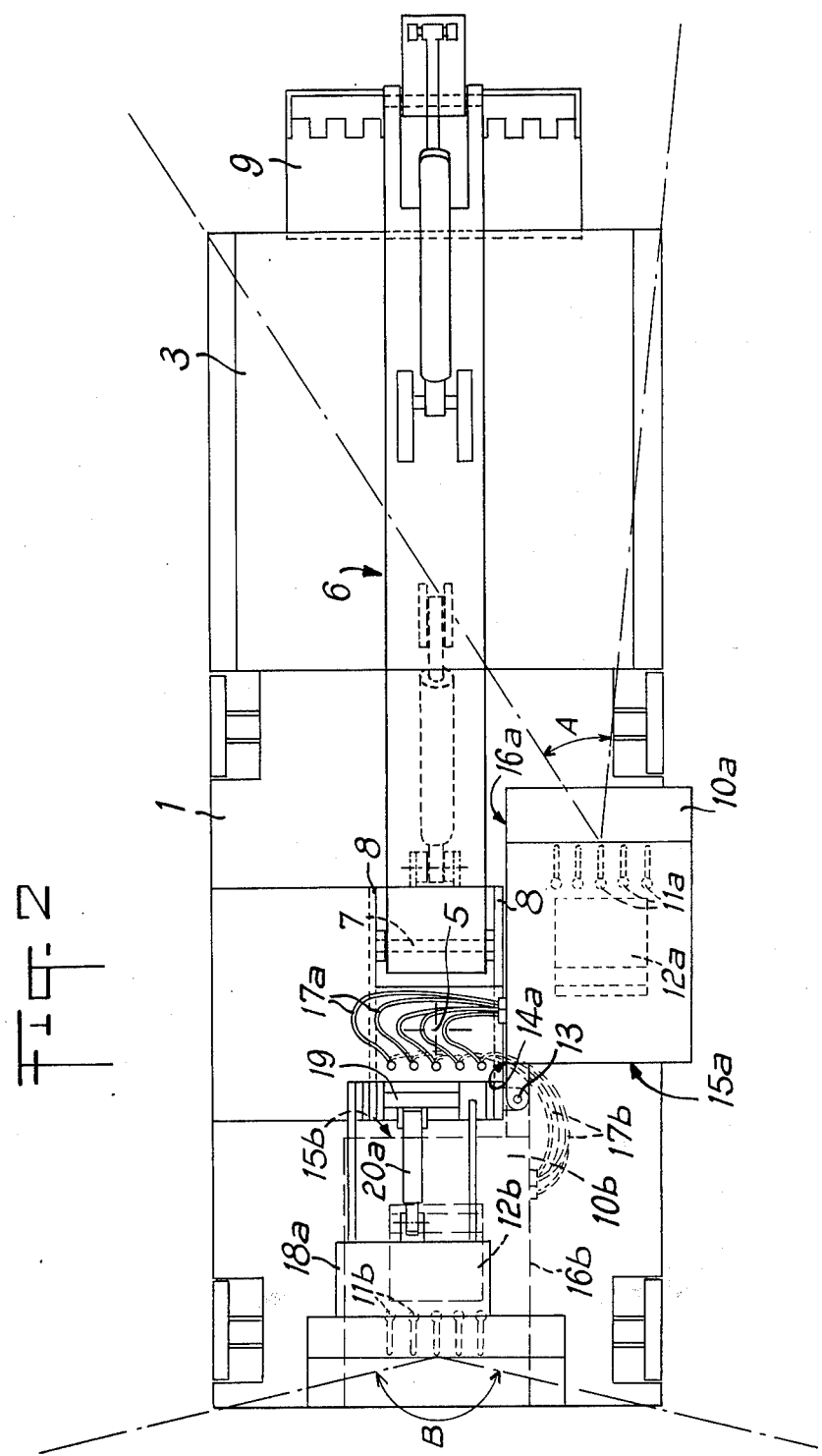

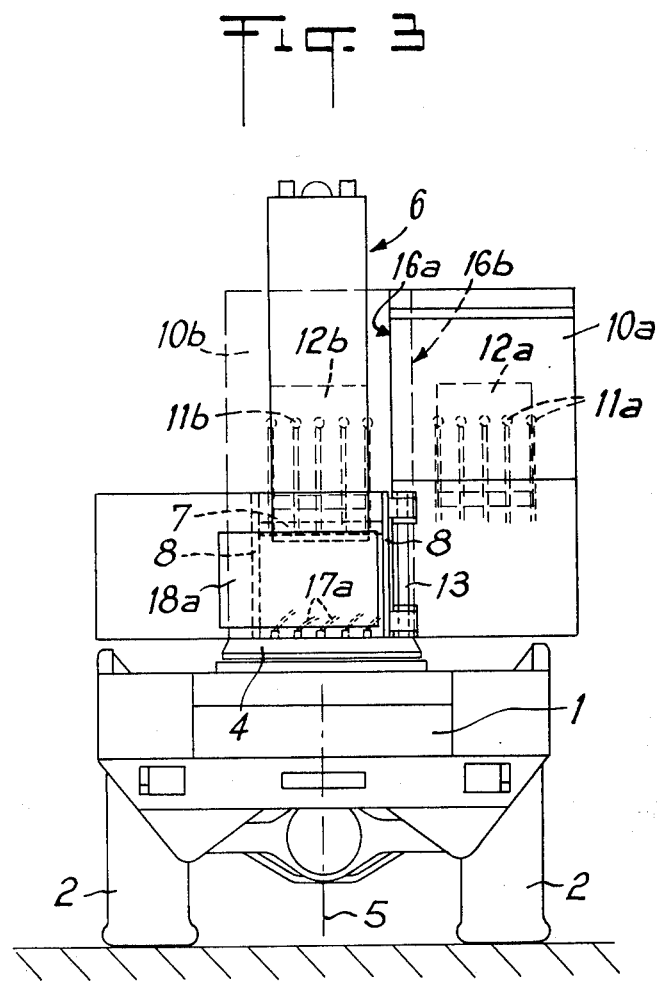

PUBLIC WORKS APPLIANCE

This invention relates to public works appliances.

The term "public works appliance" as used herein is intended to include within its scope earth moving equipment, such as shovels, cranes etc.

Public works appliances, e.g. hydraulic shovels and mobile cranes, are already known to have either two separate control cabs, one of which is used when driving the appliance on roads and the other of which is used for operating the appliance on a work site, or a single control cab which has two separate control stations, one of which is used when driving the appliance on roads and the other of which is used for operating the appliance on a work site, and also, at least in part, for displacing the appliance. A pivoting seat is generally provided in the latter case and enables the driver to be disposed facing one or other of the control stations.

The main disadvantage of such appliances lies in their substantial dimensions because certain parts — either the cabin or the control station — must be duplicated.

According to the present invention there is provided a public works appliance comprising: a frame; a working attachment mounted on the frame; and a control cab housing a single control station for selectively causing displacement of the appliance and operation of the working attachment, the control cab being mounted for rotation relative to the frame about a first axis and arranged to be selectively disposed in first and second positions which are spaced apart from one another by substantially 180° relative to said first axis, the arrangement being such that the working attachment is visible from the cab when the latter is in the first position, the field of vision from the cab in the second position thereof being unobstructed by the working attachment.

Preferably, the frame comprises a chassis mounted on means for displacing the appliance, and a turret mounted on the chasses for rotation about a second axis, the control cab and the working attachment being mounted on the turret.

In a preferred embodiment the working attachment is mounted on the frame for pivotal movement about a third axis which is disposed to the side of the control cab when the latter is disposed in the first position. Thus the working attachment may be mounted for said pivotal movement on the turret.

The first axis may be contiguous to an edge of the control cab defined by the intersection of two faces thereof, one of which is disposed adjacent to the working attachment in the first position of the control cab, the said first axis, in the first position of the control cab, being disposed more remote from the working attachment than the said third axis.

The appliance may include a counterweight which is adjustable in position relative to the frame, which, in the first position of the control cab, is offset laterally relative to said control cab, the control cab being closer to the working attachment than the counterweight, and which in said second position of the control cab is disposed closer to the working attachment than the control cab. Preferably the counterweight is mounted on the frame for pivotal movement about a fourth axis between said positions.

The frame may comprise a chassis mounted on means for displacing the appliance, and a turret mounted for rotation on the chassis, a counterweight being pivotally mounted on the turret, a jack being coupled between the counterweight and the said turret for moving the former.

The invention is illustrated, merely by way of example, in the accompanying drawings, in which:

FIG. 1 is a side elevational view of a public works appliance according to the present invention;

FIG. 2 is a view of the appliance of FIG. 1 taken in the direction of an arrow F; and FIG. 3 is a view of the appliance of FIG. 1 taken in the direction of an arrow H.

Referring to the drawings there is illustrated a public works appliance, for example a hydraulic shovel, according to the present invention. The appliance comprises a chassis 1 mounted on a plurality of wheels 2. A drive unit 3, comprising a heat engine, hydraulic pumps and a transmission for driving the wheels 2, is disposed on the chassis 1.

A turret 4 is mounted on the chassis 1 for rotation about a vertical axis 5. A working attachment 6 is mounted on the turret 4 for pivotal movement about a horizontal axle 7, the axle 7 extending between two parallel spaced apart plates 8 fixed to the turret 4. In the embodiment illustrated in the drawings, the working attachment 6 includes an excavator bucket 9.

A control cab 10a is mounted on the turret 4 for rotation about a vertical axis 13 which is contiguous to the vertical edge 14a of the cab defined by the intersection of a rear face 15a and a side face 16a which is disposed closely adjacent the axle 7 and the working attachment. The vertical axis 13 is thus disposed at the rear (left as seen in FIG. 1) of the axle 7, that is to say more remote from the working attachment than the cab.

The cab 10a can either be in the first position shown in solid lines in FIG. 1 or in a second position shown in broken lines and indicated at 10b in FIG. 1. The cab 10a includes a single control station 11a and a seat 12a. The cab is connected hydraulically to the drive unit 3 by means of a plurality of flexible hoses 17a extending between the turret 4 and the cab 10a. The cab also contains means (not shown) of selectively preventing movement thereof relative to the turret 4. These means are conventional and hold the cab either in the first position or in the second position.

The appliance has a counterweight 18a mounted on the turret 4 for pivotal movement about a horizontal axis 19. The counterweight 18a is shown in solid lines in FIG. 1 in a first position on the opposite side of the cab 10a to the working attachment. A hydraulic jack 20a is coupled between the counterweight 18a and the turret 4 in such a manner as to enable the counterweight to be raised into a second position shown in broken lines and indicated at 18b in FIG. 1.

When the counterweight is actually disposed in the second position it frees the space which it occupied in the first position. The cab can then rotate through substantially 180° about the axis 13 away from the working attachment 6 and can achieve its second position. In the second position of the cab the control station is indicated at 11b and the seat is indicated at 12b. The rear face 15a of the cab is indicated in the second position thereof at 15b and the side face 16a at 16b. It will be seen that the counterweight when in the second position, with the cab in the second position, is directly behind the rear face of the cab, that is to say closer to the working attachment than the control cab. When the counterweight is in the first position, with the cab in the first position, the counterweight is behind and offset relative to the rear face 15a of the cab, that is to say the cab is closer to the working attachment than the counterweight.

It will be noted that the cab, when in the second position, is still connected hydraulically to the drive unit 3, the flexible hoses 17a having been deformed during rotation of the cab and being indicated at 17b. It will be seen that the field of vision A of a driver in the cab when in the first position enables the bucket 9 and the working attachment 6 to be seen. When the cab is in the second position the field of vision B of the driver is unobstructed by the working attachment.

The advantage of the above described public works appliance is that using a single cab it is possible to obtain an excellent field of vision B when driving the appliance on a road at high speed without the working attachment 6 or the bucket 9 forming an obstruction whilst there is a very good field of view A of the bucket 9 and of the work being done when the appliance is operational. At any time the driver can operate the controls of the appliance, both those relating to displacement of the appliance and those relating to operation of the working attachment and bucket.

The present invention may be applied not only to earth moving appliances but also to handling appliances such as cranes. The above described public works appliance may be modified so that the turret 4 is fixed and is incapable of rotation relative to the chassis 1. The working attachment 6 may, if desired, be mounted for pivotal movement about an axis, for example, in front of the cab 10a and not at the side as illustrated. The flexible hoses 17a may be replaced by equivalent means, e.g. a rotating joint. The counterweight 18a, instead of being mounted for pivotal movement about the axis 19, may be mounted so as to be capable of sliding movement.

What is claimed is:

1. A public works appliance comprising: a frame which includes means for displacing the appliance, a chassis mounted on said means and a turret mounted on the chassis for rotation relative to the chassis; a working attachment and a control cab housing a single control station for selectively causing displacement of the appliance and operation of the working attachment, means for mounting said working attachment and said control cab on said turret, the control cab mounting means enabling rotation of the control cab relative to the working attachment so as to be selectively disposed in first and second positions relative thereto which positions are spaced apart from one another by substantially 180°, a counterweight mounted on said turret, and means for shifting said counterweight between a first position offset laterally and rearwardly with respect to said cab when said cab is in its first position and a second position to permit said cab to be shifted from its first to its second position, said counterweight being disposed at the rear of said cab when said cab is in its second position, the arrangement being such that the working attachment is visible from the one face of the cab when the latter is in the first position, the field of vision from the same face of the cab in the second position thereof being unobstructed by the working attachment.

2. Appliance according to claim 1, characterized in that the counterweight is articulated on said turret about a transverse horizontal axis, and means to adjust its position is mounted between said counterweight and said frame.

3. Appliance according to claim 1, characterized in that the working attachment is mounted on said turret to pivot about a horizontal axis disposed adjacent the cab, when the latter is in its first position, the cab being itself mounted on said turret to pivot relative to said working attachment about a vertical axis which is contiguous to its vertical edge corresponding to the intersection of its rear face and its side face which is closest to the working attachment in the first position of said cab, said vertical axis being, in this first position of said cab, disposed at the rear of the horizontal axis of pivoting of the working attachment.

\* \* \* \* \*